United States Patent [19]
Zecher et al.

[11] 4,076,694
[45] Feb. 28, 1978

[54] PROCESS FOR THE PRODUCTION OF POLYCONDENSATES CONTAINING IMIDE GROUPS

[75] Inventors: Wilfried Zecher; Werner Clarenz; Rudolf Merten, all of Leverkusen, Germany

[73] Assignee: Bayer Aktiengesellschaft, Germany

[21] Appl. No.: 708,943

[22] Filed: Jul. 27, 1976

[30] Foreign Application Priority Data

Aug. 7, 1975    Germany ............................. 2535335

[51] Int. Cl.$^2$ ..................... C08G 18/30; C08G 18/80; C08K 5/20; C08K 5/34
[52] U.S. Cl. ................... 260/77.5 MA; 260/77.5 TB; 260/30.2; 260/32.6 N; 260/33.2 R; 428/423
[58] Field of Search ................ 260/77.5 R, 77.5 MA, 260/77.5 TB

[56] References Cited

U.S. PATENT DOCUMENTS

| 3,425,973 | 2/1969 | Shaw ........................... 260/77.5 MA |
| 3,493,540 | 2/1970 | Müller et al. ................... 260/77.5 R |
| 3,686,140 | 8/1972 | Gruber et al. .............. 260/77.5 MA |
| 3,697,484 | 10/1972 | Zecher et al. .................. 260/77.5 R |
| 3,718,622 | 2/1973 | Camilleri et al. ........... 260/77.5 MA |
| 3,732,186 | 5/1973 | Dünwald ....................... 260/77.5 R |
| 3,843,587 | 10/1974 | Keating et al. ................ 260/77.5 R |
| 3,853,813 | 12/1974 | Edelman et al. ............... 260/77.5 R |
| 3,875,086 | 4/1975 | Ramey et al. .............. 260/77.5 MA |
| 3,992,316 | 11/1976 | Pedain et al. .............. 260/77.5 MA |

*Primary Examiner*—H.S. Cockeram
*Attorney, Agent, or Firm*—Connolly and Hutz

[57] ABSTRACT

Production of polycondensates coupled by cyclic imide groups by polycondensing an organic polyisocyanate or a masked organic polyisocyanate, a cyclic carboxylic acid anyhydride which is substituted by at least one further cyclic anhydride group, a carboxyl group, an ester group or an SO$_3$H group, and a monohydroxyalkyl ether at a temperature of from 0 to 450° C, lacquers produced therefrom and the use of said lacquers for coating substrates. Typical examples of said monohydroxyalkyl ethers include methyl-, isopropyl, cyclohexyl-, benzyl-, phenyl- and methoxyethyl-ethylene glycol or propylenglycol-monoethers.

6 Claims, No Drawings

PROCESS FOR THE PRODUCTION OF POLYCONDENSATES CONTAINING IMIDE GROUPS

The invention relates to a process for the production of polycondensates containing imide groups by reacting polycarboxylic acid anhydrides, polyisocyanates and hydroxyalkyl ethers, and coatings of metals produced therewith.

It is known that polyimides or polyamide imides are obtained by the reaction of polyfunctional isocyanates with polycarboxylic acid anhydrides (German Auslegeschrift No. 1,256,418 and French Patent No. 1,375,461).

The polymers are used, for example, as binding agents for anti-corrosion and decorative lacquers and as insulating films, because of their good thermal resistance, exceptional hardness with good elasticity, the total absence of thermoplasticity, exceptional solvent resistance and good adhesion to metals, particularly to aluminium. However, the strong natural colouring of the poly(amide) imides and the insufficient covering capacity of pigmented lacquers produced therewith in single layer finishes have proved to be disadvantageous for use in the field of decorative coatings. Brilliant colours, in particular a white finish, cannot be produced. Moreover, the gloss of the finishes is only barely adequate.

It has not surprisingly been found that the specified disadvantages do not occur if, for the production of finishes, polycondensates are used with contain imide groups, preferably poly(amide) imides, and which are obtained by polycondensation of certain carboxylic acid anhydride compounds, polyisocyanates and hydroxyalkyl ethers.

An object of the invention is therefore an improved process for the production of polycondensates containing cyclic imide groups by polycondensating organic polyisocyanates or masked isocyanates with cyclic carboxylic acid anhydride compounds, which in addition to the cyclic anhydride group are substituted by at least a further cyclic anhydride, carboxyl, ester or $SO_3H$- group at temperatures of from 0° to 450° C optionally in a solvent, the improvement comprises that the polycondensation takes place in the presence of hydroxyalkyl ethers of the following formula:

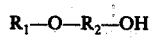

in which $R_1$ represents an alkyl, aralkyl or aryl radical and $R_2$ represents an alkyl radical.

A further object of the invention is the use of these polycondensates containing imide groups for lacquering metals.

It has been shown that the condensation products containing imide groups according to the invention are far more suitable as binding agents for metal coatings than the known polyamide imides. Lacquers produced from the polycondensates according to the invention are perceptibly brighter and display an excellent gloss without deterioration of mechanical properties. In addition, lacquers with brighter colours can be produced and the colour retention of the coating under thermal aging is better. At the same time no reduction in hardness, thermoplasticity, mechanical properties and adhesion to metals was detected. The lower viscosity of the polymers produced according to the invention permits production of lacquers with a greater solids content with which desired coat thicknesses can be achieved, often with a single application.

Polyisocyanates suitable for the inventive process include aliphatic, cycloaliphatic, araliphatic, aromatic, and heterocyclic polyisocyanates (cf. Annalen 562, pages 75 to 136), for example ethylene diisocyanate 1,4-tetramethylenediisocyanate 1,6-hexamethylenediisocyanate 1,12-dodecanediisocyanate, cyclobutane-1,3-diisocyanate, cyclohexane-1,3- and 1,4-diisocyanate and any mixtures of these isomers, 1-isocyanato-3,3,5-trimethyl-5-isocyanato-methyl-cyclohexane (German Auslegeschrift No. 1,202,785), 2,4- and 2,6-hexahydrotoluylene-diisocyanate and any mixtures of these isomers, hexahydro-1,3- and/or -1,4-phenylene diisocyanate, perhydro-2,4'- and/or -4,4'-diphenylmethane-diisocyanate, 1,3-and 1,4-phenylene-diisocyanate, 2,4- and 2,6- toluylene diisocyanate and any mixtures of these isomers, diphenylmethane-2,4'- and/or -4,4'-diisocyanate, naphthylene-1,5-diisocyanate, triphenylmethane-4, 4', 4"-triisocyanate, polyphenyl-polymethylene polyisocyanates as obtained by aniline-formaldehyde-condensation and subsequent phosgenation and as for example described in British Pat. Nos. 874,430 and 848,671, perchlorinated aryl polyisocyanates, as for example described in German Auslegschrift No. 1,157,601, polyisocyanates having carbodiimide groups, as described in German Pat. No. 1,092,007, diisocyanates, as described in U.S. Pat. No. 3,492,330, polyisocyanates having allophanate groups, as for example described in British Pat. No. 994,890, Belgian Pat. No. 761,626 and the published Dutch patent application No. 7,102,524, polyisocyanates having isocyanurate groups, as for example described in German Pat. Nos. 1,022,789, 1,222,067 and 1,027,394 and in German Offenlegungschriften Nos. 1,929,034 and 2,004,048, polyisocyanates having urethane groups, as for example described in Belgian Pat. No. 552,261 or in U.S. Pat. No. 3,394,164, polyisocyanates having acylated urea groups according to German Pat. No. 1,230,778, polyisocyanates having biuret groups, as for example described in German Pat. No. 1,101,394, British Pat. No. 889,050 and French Pat. No. 7,017,514, polyisocyanates produced by telomerisation reactions, as for example described in Belgian Pat. No. 723,640, polyisocyanates having ester groups, as for example described in British Pat. Nos. 956,474 and 1,072,956, in U.S. Pat. No. 3,567,763 and in German Pat. No. 1,231,688, and reaction products of the above mentioned isocyanates with acetals according to German Pat. No. 1,072,385.

It is also possible to use distillation residues having isocyanate groups which occur in technical isocyanate production, optionally dissolved in one or more of the above mentioned polyisocyanates. It is also possible to use any mixtures of the above mentioned polyisocyanates.

Preferred polyisocyanates are of the general formula:

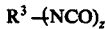

in which $R^3$ represents an optionally substituted alkyl radical with 1-20 C-atoms, an aryl radical with 5-12 C-atoms, a cycloalkyl radical with 5-12 C-atoms, an alkyl-aryl radical with 6-20 C-atoms and an aryl or cycloalkyl radical with 5-12 C-atoms containing a heteroatom such as N, O or S. The number z is an integer from 2-4, preferably 2 or 3, most preferably 2.

It is preferable to use the technically easily accessible mixtures of toluylene-diisocyanates m-phenylene diisocyanate, and phosgenated condensates of aniline and formaldehyde with a polyphenylene-methylene-structure and the symmetrical compounds 4,4'-diisocyanato-diphenylmethane, 4,4'-diisocyanato-diphenylether, p-phenylene diisocyanate and 4,4'-diisocyanato-diphenyl-dimethylmethane.

The isocyanates can be used in free form, and also partially or completely in the form of their derivatives formed by reaction with reactive compounds containing hydrogen and reacting as masked isocyanates under the reaction conditions.

Preferably the carbamic acid esters obtained from aromatic and aliphatic mono-and polyhydroxy compounds and the addition products of lactams, oximes and CH-acid compounds are used as donors to produce masked isocyanates.

As examples, the carbamic acid esters of phenol, isomeric cresols, technical mixtures thereof and similar aromatic hydroxyl compounds should be mentioned, in addition, aliphatic monoalcohols, such as methanol, ethanol, propanol, isopropanol, butanol, isobutanol, cyclohexanol, benzyl alcohol and aliphatic di- or polyols such as ethylene glycol and trimethylol propane, and also the addition products with 2-pyrrolidone, caprolactam, butanone-oxime, malonic ester and acetic acid ester.

The masked isocyanates can be used as such or produced in situ by reaction with alcohols.

Instead of the specified polyisocyanates, the analogous poly-isothiocyanates can be used as the starting materials.

The hydroxyalkyl ethers used according to the invention are, for example, compounds of the following formula:

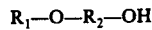

in which $R_1$ represents an optionally substituted aliphatic radical with 1–20 preferably 1–8 C-atoms, cycloaliphatic radical with 4–10, preferably 5–8 C-atoms aliphatic-aromatic radical with 7–16 C-atoms or aromatic radical with 6–14 C-atoms, which for instance can be substituted with alkoxy, aroxy or hydroxy groups, and $R_2$ represents an aliphatic radical with 2–20 C-atoms. According to the invention, those hydroxyalkyl ethers are preferably used which contain one hydroxy group per molecule and in which $R_2$ represents a radical with 2 C-atoms in the chain, which can for example be substituted by alkyl groups, e.g. methyl, isopropyl, cyclohexyl, benzyl, phenyl, and methoxyethyl-ethyleneglycol and propylene-glycol-monoethers.

The cyclic carboxylic acid anhydride compounds which are used are preferably cyclic carboxylic acid anhydride compounds of the general formula:

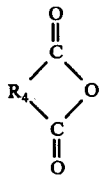

in which $R_4$ represents an optionally substituted aliphatic with C atoms, cycloaliphatic with C atoms, heterocyclic, aliphatic-aromatic or aromatic radical, which in addition to the cyclic anhydride group is substituted at least once by a further functional group capable of condensation such as a cyclic anhydride group, a carboxyl-, carbalkoxy-, carbaroxy- or $SO_3$—H group.

Examples of the carboxylic acid anhydrides used are:

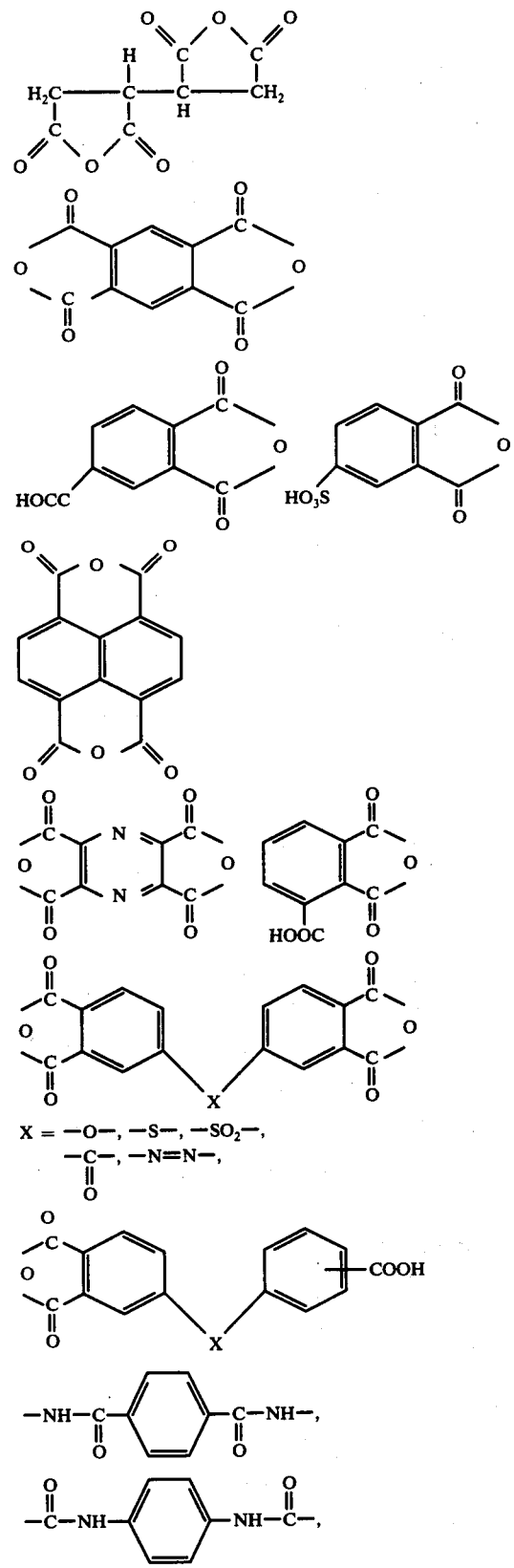

-continued

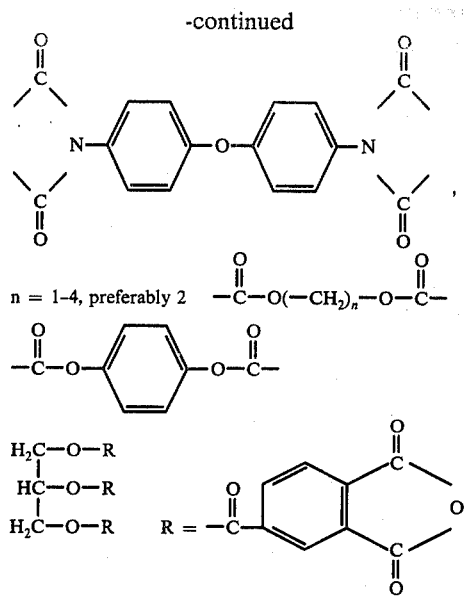

n = 1-4, preferably 2

It is also possible to use mixtures of the specified anhydrides. Instead of the carboxylic acid anhydrides, other acid derivatives or the polycarboxylic acid itself can be used, e.g. the corresponding phenyl ethers, which in the course of the reaction can be converted into acid ahydrides. Trimellitic acid anhydride is preferred. The reaction according to the invention can be carried out in solvents which do not react under the reaction conditions or only form loose addition compounds, which react further.

Suitable solvents are: (halogen)-hydrocarbons, phenols, esters, ketones, ethers, substituted amides, nitriles, phosphoric acid amides, sulphoxides and sulphones, for example xylene, o-dichlorobenzene, phenol, cresols, acetophenone, cyclohexanone, glycolmonomethylether acetate, N-methyl-pyrrolidone, dimethylformamide, dimethylacetamide, benzonitrile, hexamethyl-phosphoric acid triamide, dimethyl sulphoxide, tetramethylene sulphone and mixtures thereof. Preferably dimethylformamide, dimethylacetamide N-methyl pyrrolidone and aromatic hydrocarbons substituted by alkyl groups are used.

To carry out the process according to the invention the reaction components with or without a solvent are maintained for a period of from a few minutes to several hours at temperatures of from 0° to 450° C. The end of the reaction is marked by the end of evolution of gas and the increasing viscosity. Sometimes it is advantageous to conduct the reaction in several stages or to add the individual components in a different sequence or at differing temperatures. Thus, in the first stage, e.g. in a solvent, an adduct or condensate can be produced, which then at higher temperatures, possibly with the evaporation of the solvent or chain extension or cross-linking, is converted into the higher molecular weight condensation product.

In many cases it is to be recommended to carry out the reaction under an inert protective gas such as nitrogen or argon. The reaction can take place discontinuously or continuously or, so as to reach a higher reaction temperature, even in an autoclave under pressure.

In general it is advantageous to select the relative proportions of the polyisocyanates and the polycarboxylic acid anhydrides compounds so that the reactive groups are equivalent or so that there is an excess of isocyanate or carboxylic acid up to 10% of the equivalence, but very considerably deviations from these stoichiometric ratios are also possible. The hydroxyalkyl ethers are used in quantities of from 0.1 to 40, preferably from 2 to 10% in gram equivalents relative to one gram equivalents of isocyanate. In addition, the condensation products can be modified by the simultaneous use and the incorporation of, for example, polyols, polycarboxylic acids, polycarbamide esters, silicone resins and polyesters and polyethers. Examples which should be mentioned include ethylene glycol, trimethylolpropane, isophthalic acid, trimesic acid, a polycarbamide ester of 2,4-toluylene diisocyanate and ethylene glycol, a polyester of terephthalic acid, ethylene glycol and glycerine and polyethers of ethylene oxide or of bis-(hydroxyphenyl)-propane and epichlorhydrin.

The reaction according to the invention can be influenced by catalysts, e.g. borontrifluoride and its adducts, amines such as triethyl amine, 1,4-diazo-bicyclo-(2,2,2)-octane, N-ethyl-morpholine and N-methyl-imidazole, phenols such as phenol and m-cresol, lactams such as caprolactams and 2-pyrrolidone, oximes such as butanone oxime and organic and inorganic metal compounds, in particular of iron, lead, zinc, tin, copper, cobalt and titanium, such as iron (III) chloride, cobalt acetate, lead oxide, zinc octoate, dibutyltin dilaurate, copper acetyl acetonate and titanium tetrabutylate, and by phosphorus compounds such as trialkyl phosphine and 1-methyl-phospholine oxide.

The polycondensates containing imide groups according to the invention, preferably poly(amide) imides, which can be optionally further modified by mixing with polyesters, are particularly suitable for the production of high temperature-resistant metal coatings. The lacquers obtained according to the invention can be applied to sheet metal of any kind in known manner. Preferably aluminium or steel plate is coated.

In the following examples percentages are by weight unless otherwise indicated.

EXAMPLE 1

Ia. 192 g trimellitic acid anhydride, 4.6 g ethylene glycol monomethyl ether and 253 g 4,4'-diisocyanato-diphenylmethane are put into 365 g dimethylacetamide. The mixture is then heated to 80° and maintained for 4 hours at 80° and then for a further 4 hours at 120°. Condensation to form a polyamide imide takes place under the evolution of carbon dioxide. The reaction product is diluted with 480 g N-methylpyrrolidone. A yellow-brown viscous solution is obtained having a viscosity $\eta_{20}$ of 1200 mPa s. Measurement of the viscosity was carried out with a rotation viscosimeter of the Haake VT 23 type in a thermostat-equipped measurement container. The IR-spectrum shows the band combination typical of imides at 1715 and 1775 cm$^{-1}$.

b. 150 g of a 30% solution of the reaction product in N-methylpyrrolidone/dimethyl acetamide in a ratio of 4.5:6 are stirred with 33.7 g TiO$_2$-rutile (Bayertitan ® R-FD-I) and diluted with 71 g of the solvent mixture of N-methylpyrrolidone/dimethylacetamide (4.5 : 6) to a solids content of 39.9%. The outflow time of this solution, measured according to DIN 53 211, was 50 sec.

The lacquer is sprayed onto an aluminium or Erichsen plate and stoved for 10 minutes at 250° C. The brilliance of the lacquer is measured according to Gardner at 60° C, the Erichsen value (E) according to DIN 53 156, the pencil hardness according to DIN 46 453 and the impact cupping by means of a ball impact test apparatus according to Gardner, type 304, and the results are specified in Table 1.

c. 150 g of a 30% solution of the condensation product obtained as above in N-methylpyrrolidone/dimethylacetamide (4.5 : 6) are stirred with 33.7 g TiO$_2$-rutile (Bayertitan ® R-FD-I) and the solution is diluted with 60.2 g dimethylformamide to give a solution having a solids content of 32.3%.

The outflow time of this solution, measured according to DIN 53 211, is 50 s.

The lacquer solution is sprayed onto an aluminium or Erichsen plate and stoved for 10 minutes at 250° C. The properties of the lacquer, determined as described above, are given in Table 1.

II. Comparison test a. 500 g of 4,4'-diisocyanato- diphenylmethane are added to a solution of 384 g of trimellitic acid anhydride in 1680 g of N-methylpyrrolidone and the mixture is stirred at 80° C for 6 hours and at 200° C for further 6 hours. A light brown 30% solution is obtained.

b. 33,7 g of TiO$_2$-rutile (Bayertitan ® R-FD-I) are stirred into 150 g of the polyamide imide solution obtained above and the solution is diluted with 140 g of dimethyl acetamide to form a solution having a solids content of 24.3%. The outflow time of the solution is 50 sec. The lacquer solution is applied as specified under Ib) and the properties of the lacquer are determined according to Ib) and specified in Table 1.

c. 47.5 g TiO$_2$-rutile (Bayertitan ® R-FD-I) are stirred into 200 g of a 30% solution of the polyamide imide obtained as above and the solution is diluted with 240 g of a solvent mixture of 20 parts N-methylpyrrolidone, 10 parts xylene, 3 parts ethyl glycol and 5 parts methanol to form a solution having a solids content of 25.1%. The outflow time of the solution is 50 sec.

The solution is stoved to form a lacquer as specified under Ib, of which the properties are given in Table 1.

having imide bands at 1720 and 1780 cm$^{-1}$ and a viscosity $\eta_{20}$ of 4200 mPa s.

EXAMPLE 4

440 g N-methylpyrrolidone, 5.2 g ethylene glycol-monoisopropyl ether, 96 g trimellitic acid anhydride and 125 g 4,4'-diisocyanatodiphenyl methane are agitated for 4 hours at 80°, 4 hours at 120° and 1 hour at 140°. A solution of the condensation product is obtained having a viscosity at 25° of 12700 mPa s and imide bands at 1720 and 1775 cm$^{-1}$. A sample of the lacquer solution is applied to a glass plate and stoved at 250° to form a clear elastic film.

EXAMPLE 5

140.4 g 2,2-bis-(4-isocyanotophenyl)-propane, 96 g trimellitic acid anhydride and 2.3 g ethylene glycol monomethyl ether are put in a mixture of 250 g N-methylpyrrolidone and 192 g dimethyl acetamide. Subsequently the mixture is agitated for 6 hours at 80°, 4 hours at 120° and 2 hours at 130°. A light brown solution of the polyamide imide is produced having a viscosity $\eta_{20}$ of 850 mPa s, which is diluted with xylene and stoved at 250° on a plate to form a clear elastic lacquer film.

EXAMPLE 6

96 g trimellitic acid anhydride, 126.5 g 4,4'-diisocyanato-diphenylmethane and 4.1 g phenoxyethanol are agitated in 440 g N-methylpyrrolidone for 4 hours at 80°, 4 hours at 120° and 2 hours at 130°. A light brown solution of the polyamide imide is obtained having a viscosity $\eta_{25}$ of 960 mPa s and imide bands at 1715 and 1780 cm$^{-1}$.

EXAMPLE 7

A solution of 126 g 4,4'-diisocyanato-diphenylether and 80 g phenylene-(1,3)-diisocyanate in 470 g N-methylpyrrolidone is mixed with 10.6 g ethylene glycol-monomethyl ether and 192 g trimellitic acid anhydride and then agitated for 4 hours at 80°, 4 hours at 120° and 2 hours at 140°. The reaction product is a clear brown solution with imide bands at 1715 and 1775 cm$^{-1}$ and having a viscosity of 1050 mPa s. A sample of the polyamide imide solution is diluted with xylene and stoved on a plate at 250° to form a clear elastic lacquer film.

Table 1

| Colour shade | Lacquer | Coat thickness μm | Brilliance Gardner 60° | E-Value mm | Hardness 20° C | Hardness 180° C | Impact cupping | | |
|---|---|---|---|---|---|---|---|---|---|
| | | | | | | | pressure zone | inch p | tension zone |
| Lighter | I b) | 10 | 85 | 7.0 | >7H | >7H | 34 | | 36 |
| Darker | II b) | 9–10 | 57 | 7.1 | >7H | >7H | 34 | | 40 |
| Lighter | I c) | 13 | 100 | 7.1 | 7H | 7H | 34 | | 38 |
| Darker | II c) | 8 | 57 | 7.1 | 7H | 7H | 34 | | 38 |

EXAMPLE 2

440 g N-methylpyrrolidone, 96 g trimellitic acid anhydride, 126 g 4,4'-diisocyanato-diphenylmethane and 6.0 g diethylene glycol monomethyl ether are heated for 4 hours to 80°, for 4 hours to 120° and for 1 hour to 140°. A light brown solution of the polyamide imide is obtained having a viscosity $\eta_{25}$ of 831 mPa s. A sample of this solution is applied to a plate and stoved at 250° to form a clear elastic polyamide imide film

EXAMPLE 3

171 g toluylene-(2,4)-diisocyanate and 192 g trimellitic acid anhydride are dissolved in 630 g N-methylpyrrolidone. Then 30 g of a 10% solution of ethylene glycol-monomethyl ether are added dropwise to the N-methylpyrrolidone solution and the mixture is agitated for 5 hours at 80°, 4 hours at 120° and 2 hours at 130°. A light brown solution of the polyamide imide is obtained

What we claim is:

1. A product produced by the process of polycondensing at a temperature of from 0° to 450° C a mixture containing an organic polyisocyanate or masked polyisocyanate, a carboxylic acid cyclic anhydride substituted by at least one further cyclic anhydride group, a carboxyl group, an ester group or an SO$_3$H group and a monohydroxyalkyl ether, the relative proportions of the organic polyisocyanate or masked polyisocyanate and the substituted carboxylic acid cyclic anhydride being selected so that the reactive groups are present in equivalent amounts or up to an excess of 10% thereof and the monohydroxyalkyl ether being present in an amount of from 0.1 to 40% gram equivalents per gram equivalent of isocyanate.

2. The product of claim 1 wherein the polycondensation is carried out in the presence of a solvent and/or a catalyst.

3. The product of claim 1 wherein the monohydroxyalkyl ether is a methyl-, isopropyl-, cyclohexyl-, benzyl-, phenyl- or methoxyethyl-ethylene glycol or propyleneglycolmonoether.

4. The product of claim 1 wherein the monohydroxyalkyl ether is of the formula $$R_1-O-R_2-OH$$

wherein R is an optionally substituted $C_1-C_{20}$ alkyl, $C_4-C_{10}$ cycloalkyl, $C_7-C_{16}$ aryalkyl or a $C_6-C_{14}$ aryl radical and $R_2$ is a $C_2-C_{20}$ alkylene radical.

5. A coating or lacquering composition containing the product of claim 1.

6. A substrate coated or lacquered with a composition of claim 5.

* * * * *